(12) United States Patent
Nemes

(10) Patent No.: US 12,455,039 B2
(45) Date of Patent: Oct. 28, 2025

(54) HOLDING APPARATUS FOR SUPPORTING AND CONNECTING AN INDUSTRIAL MOBILE DEVICE

(71) Applicant: Géza Sándor Nemes, Budapest (HU)

(72) Inventor: Géza Sándor Nemes, Budapest (HU)

( * ) Notice: Subject to any disclaimer, the term of this patent is extended or adjusted under 35 U.S.C. 154(b) by 25 days.

(21) Appl. No.: 18/568,174

(22) PCT Filed: May 30, 2022

(86) PCT No.: PCT/HU2022/050049
§ 371 (c)(1),
(2) Date: Dec. 8, 2023

(87) PCT Pub. No.: WO2022/259002
PCT Pub. Date: Dec. 15, 2022

(65) Prior Publication Data
US 2024/0271749 A1    Aug. 15, 2024

(30) Foreign Application Priority Data

Jun. 8, 2021  (HU) .................................. U2100116

(51) Int. Cl.
*F16M 13/02*  (2006.01)
*F16M 11/04*  (2006.01)
(Continued)

(52) U.S. Cl.
CPC ........ *F16M 13/022* (2013.01); *F16M 11/041* (2013.01); *F16M 11/10* (2013.01); *H04M 1/04* (2013.01)

(58) Field of Classification Search
CPC .... F16M 13/022; F16M 11/041; F16M 11/10; H04M 1/04
See application file for complete search history.

(56) References Cited

U.S. PATENT DOCUMENTS 6,581,893 B1 *  6/2003  Lu .......................... F16M 11/10
                                              16/337
6,796,541 B2 *  9/2004  Lu ....................... E05D 11/1007
                                              16/342
(Continued)

FOREIGN PATENT DOCUMENTS

WO   WO-2012155047 A2 * 11/2012  ............... E06B 7/28
WO   WO-2021041647 A1 *  3/2021  ........... A45C 11/002

OTHER PUBLICATIONS

WO2012155047 (Year: 2012).*

*Primary Examiner* — Monica E Millner

(57) ABSTRACT

Holding apparatus for supporting and connecting an industrial mobile device has a flat body, a pair of oppositely located parallel sides, and an industrial-type connector plug. The holding apparatus is connectable to a suspension assembly having a holding unit with a support block that has a hollow interior. A connector socket is arranged at a side of the support block to receive the connector plug, and the socket has a shaped profile that provides electrical connection and both holds and fixes the industrial connector plug and the device. The bottom of a flat holding frame is connected to a rear side of the support block and has a height corresponding to the distance between the two holding sides of the device. The holding frame has an upper side from which a fixing nest extends out, the holding frame designed such that a resilient pressure acts on the device.

10 Claims, 4 Drawing Sheets

(51) Int. Cl.
*F16M 11/10* (2006.01)
*H04M 1/04* (2006.01)

(56) References Cited

U.S. PATENT DOCUMENTS

| | | | | |
|---|---|---|---|---|
| 7,422,379 B2* | 9/2008 | Agevik | ............... | G03B 17/561 455/575.8 |
| 7,508,656 B2* | 3/2009 | Okahara | ............... | G09F 9/30 16/337 |
| 7,712,187 B2* | 5/2010 | Hsu | ............... | F16M 11/10 16/337 |
| 7,845,051 B2* | 12/2010 | Saito | ............... | G06F 1/1681 16/337 |
| 8,070,026 B2* | 12/2011 | Wadsworth | ............ | F16M 13/04 224/269 |
| 8,989,826 B1* | 3/2015 | Connolly | ............... | A45C 11/00 455/575.8 |
| 9,510,662 B1* | 12/2016 | Bruns | ............... | A45F 5/02 |
| 9,755,685 B2* | 9/2017 | Sumpter | ............... | A45C 11/04 |
| 10,999,958 B2* | 5/2021 | Frazier | ............... | A45F 5/021 |
| 2007/0254729 A1* | 11/2007 | Freund | ............... | H04M 1/04 455/575.3 |
| 2011/0077061 A1* | 3/2011 | Danze | ............... | H04M 1/185 455/575.1 |
| 2012/0083153 A1* | 4/2012 | Schmidt | ............... | F16M 13/00 248/351 |
| 2013/0148839 A1* | 6/2013 | Stevinson | ............ | H04R 1/1033 381/384 |
| 2013/0258573 A1* | 10/2013 | Muday | ............... | G06F 1/1613 361/679.01 |
| 2014/0085814 A1* | 3/2014 | Kielland | ............... | F16M 13/00 361/679.55 |
| 2019/0063667 A1* | 2/2019 | Law | ............... | H04M 1/04 |
| 2019/0242520 A1* | 8/2019 | Griggs | ............... | F16M 13/02 |
| 2022/0378205 A1* | 12/2022 | Cheney | ............... | F16M 11/041 |

* cited by examiner

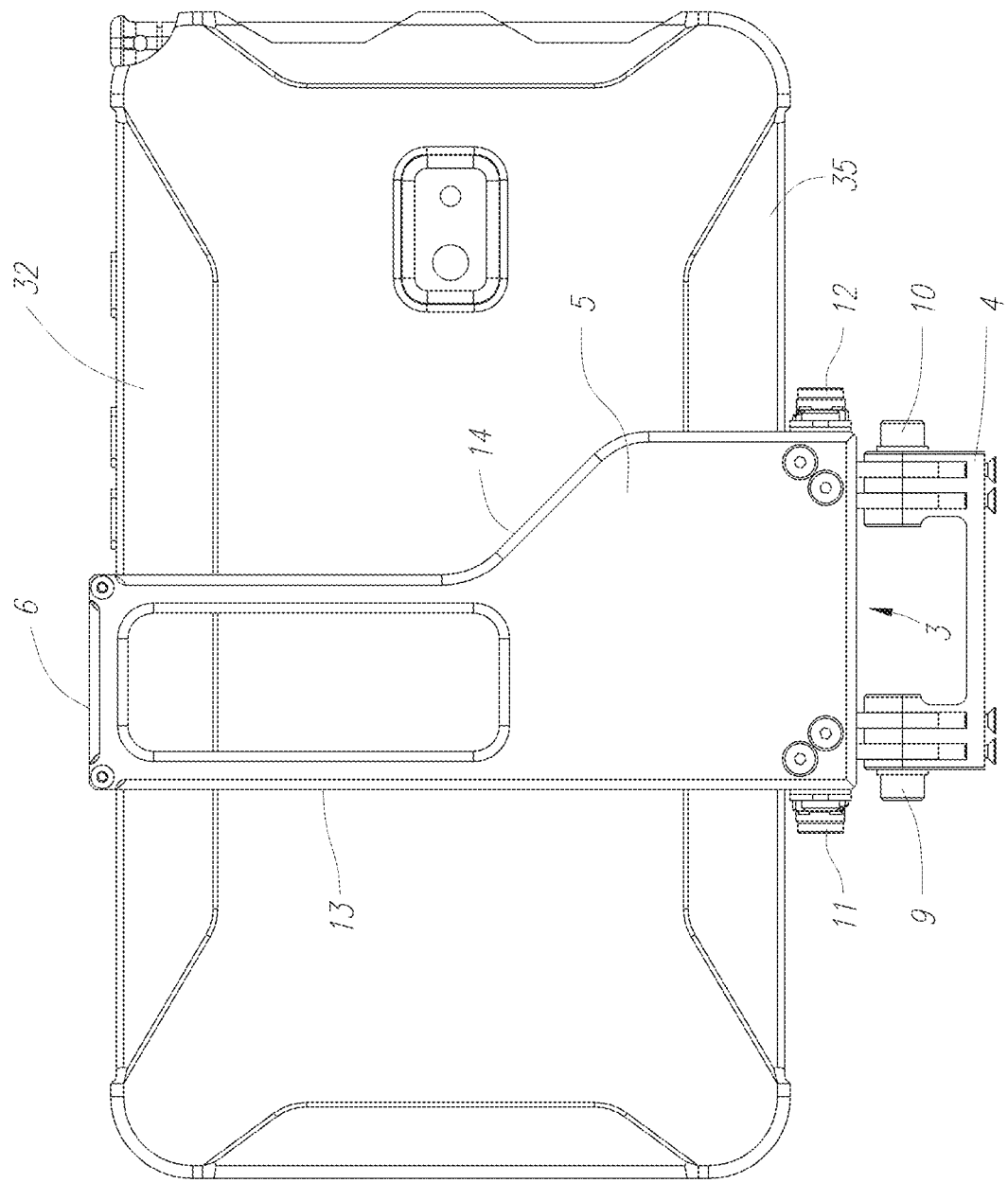

HOLDING APPARATUS FOR SUPPORTING AND CONNECTING AN INDUSTRIAL MOBILE DEVICE

The invention relates to holding apparatus for supporting and connecting an industrial mobile device, wherein the mobile device has a flat body and comprises at least in the portions used for holding a pair of oppositely located parallel sides. At one of the sides of the device an industrial-type connector plug is arranged, and the holding apparatus can be connected to a suspension assembly and comprises a holding unit that can be releasably attached to the oppositely located holding side where the device is held. The holding unit comprises a friction hinge and a support block connected both to the hinge and the device.

The use of computers, tablets, mobile phones and other smart devices has become indispensable part of our life in practically all areas of activities. This is especially true for different professional applications when such devices are necessary components of everyday work. Work is done not only in offices with indoor circumstances but also under outdoor conditions, in the field with rough circumstances when users require their both hands to carry on. The holding, arrangement and handling of such devices must be ensured also under such conditions to attain that the weight required for their holding be as small as possible and the reliability, protection and comfort of use should be at maximum.

The hard field circumstances may happen under military, police, security, industrial and sport activities, and to such purposes specially designed devices have been developed that comprise water- and shock proof cases and connectors. In the present specification such devices are referred to simply as "industrial devices" which include tablets, mobile phones and other electronic devices equipped with a display to which often different peripheral accessories should be connected. The term peripheral accessory covers reserve battery packs, different electronic field units, ad handling devices which can be used only when connected to the industrial device. The user should wear the industrial device on his/her body, possibly at the region of the chest to leave both hands free, however, during use for watching the display the device must be able for being turned near right angle to the chest of the user. The turning of the device changes in most of the cases the length of the cables leading to the peripheral devices that impose a pulling or pushing force on the concerned cable which might has an adverse effect on the safety of the connection and can lead to cable-breakage or disruption of the wires in the cables. Against such adverse effects up to the present the solution was the increase of the size and weight of the connectors and cables.

In field, sport and free time apparels the use of MOLLE/PALS clothing has become more and more spread using poches and straps. Such clothes can be seen e.g., in US 2007/0289045 A1 that are provided with tongues having special designs with a fully bent end parts that can be tucked into pouches made by special straps, and different utensils and gears can be held thereby. Many of the modern industrial and free time sports outfits are equipped with such pouches and straps.

The publication US 2013/0258573 provides a solution for holding and connecting industrial devices wherein on a holding tongue a specially designed hinge is arranged that can be suspended in the pouches of a MOLLE clothing and the hinge is attached to the wide side of the rectangular device more precisely to the case of the device, and the electrical connections are solved by a separate block forming part of the case and arranged at the short side of the device, wherein the connection to the peripheral units was made by a vertically extending cable as the connector was fixed to the bottom of the block. The inside of the block provide space for the positioning of electrical components required for the connection but the manipulation there is rather difficult.

In that solution the hinge allowed for the device to be folded out to take a horizontal position but during such a turning the initially vertical position of the connection cable changed to take a horizontal direction, whereby the free length of the cable has become shorter and has also been bent by 90°, causing a substantial mechanical load thereon. In the vertical holding position a separate member is used to connect the device with the suspension assembly that renders the forward bending difficult, and its use requires a separate mechanical step and attention.

There exist hinges that can be turned only under the application of a predetermined torque which are generally referred to as "torque hinges", which will be called in the present specification as "friction hinges" or simply hinges because the required torque is provided by friction forces within the design of the hinge.

A further much more robust and heavy solution for the connection of the device is described in WO 2021/041647, in which the holding of the device (called there as control center) is provided along the longer side and the electrical connection takes place also at the shorter side connected with the drawbacks outlined before.

The task of the invention is to provide a holding apparatus for such industrial devices that has smaller volume and space than the afore mentioned systems and can provide a more reliable connection of the cable or cables and provides an easier handling.

With the invention a holding apparatus has been provided for supporting and connecting an industrial mobile device, wherein the mobile device has a flat body and comprises at least in the portions used for holding a pair of oppositely located parallel sides, and an industrial-type connector plug at one of said held sides, the holding apparatus can be connected to a suspension assembly, and the holding apparatus comprises a holding unit that can be releasably attached to the oppositely located holding side where the device) is caught and held, and the holding unit comprises a friction hinge having a hinge body, and a support block connected both to the hinge and the device, wherein according to the invention the friction hinge can be connected to the suspension assembly, and the support block has a rectangular shape and comprises a hollow interior, and a connector socket is arranged at the side of the support block opposite to the side connected to the hinge to receive the industrial-type connector plug when said device is in the held and fitted position, and the socket has a shaped profile that in addition to providing electrical connection both holds and fixes the industrial connector plug and the device itself in all directions in a stable way except for the direction of its insertion, and to a rear side of the support block lying normal to the side where the socket is arranged the bottom of a flat holding frame is connected, and the flat holding frame has a height that corresponds to the distance between the two holding sides of the device, and the holding frame has an upper side from which a fixing nest is extending out in a direction normal to the plane of the holding frame that has a size along this normal direction that corresponds to the thickness of the upper side of the device, and at the outer end of the fixing nest a short, downwardly extending rim is arranged, wherein the height and the material of the holding frame is designed so that the fixing nest acts with a resilient pressure on the device when being attached thereto, whereby the device is held in the holding frame under the effect of this pressure.

In a preferred embodiment the connection of the friction hinge is provided by spaced ribs extending out from its bottom towards the support block and lugs extending out from the bottom of the support block and inserted into the spaces between the ribs as well by bearing shafts interconnecting the ribs and the lugs, the connector socket is arranged at the opposite upper side of the support block from where the lugs extend out, and at the two sides of the upper surface of the connector socket upwardly directed edges are provided and between the edges outwardly swelling sections are arranged, and between the edges at least a further section is arranged that has an upper surface extending parallel with the upper side and the section swells out more than the other sections beside it, and the profile of the upper part of the connector socket is complementary i.e., negative to the profile of the bottom of the industrial connector plug of the device, and at least at one side of the support block a multi-pole industrial connector is arranged having contacts coupled to circuit components and/or wires arranged in the hollow interior of the support block and to contacts of the socket.

For fixing the socket in the interior of the hollow support block a pair of column supports is arranged, both having a central bore, and the socket is attached to the support block by means of threaded bolts led through these central bores.

It is preferred if respective industrial connectors are mounted to both lateral ends of the support block.

For decreasing the weight and providing the necessary flexibility an opening is provided at the upper part of the holding frame, and at the two sides of the opening respective narrow branches are provided having upper ends coupled to respective sides of the fixing nest.

It is also preferred if from both sides of the body of the hinge respective triplets of spaced ribs are extending out in upward direction towards the support block, and in the spaces between the ribs respective lugs are arranged extending out from the support block in downward direction towards the hinge, and at both sides respective bearing shafts are inserted and led through bores provided in the ribs and lugs to press said ribs and lugs together with a predetermined force.

The stability of the connection is increased if at the upper part of the socket on the support block two upwardly extending spaced sections are provided, and the device to be held by the holding apparatus has a connector plug that has a form-fitting complementary shape with respect to the shape of the socket and has nests opposite to these spaced sections, and the contacts of the socket can get into electrical contact with contacts of the connector plug only after the complementary-profiled sections have been at least partially inserted into each other.

It is preferred if in the hollow interior of the support block the required electrical components are mounted on a printed circuit board fixed in the hollow interior.

It is further preferred if the suspension assembly that can be connected to the body of the hinge comprises a plurality of spaced holding tongues that can be inserted into respective pouches of a MOLLE type gear, wherein the holding tongues are arranged symmetrically with respect to the holding unit.

In an alternative design the suspension assembly that can be connected to the body of the hinge comprises a plurality of spaced holding tongues that can be inserted into respective pouches of a MOLLE type gear, wherein the holding tongues are arranged asymmetrically with respect to the holding unit at one side thereof, and from the other side of the holding unit a connection tab extends out for enabling the use of further holding tongues.

The holding apparatus made according to the invention provides a solution for the tasks set because provides at the same time a perfect mechanical and electrical connection for the device, has small volume and weight, and the connection cables are led along protected routes and are loaded only by small twisting and not by bending.

The invention will now be described in connection with exemplary embodiments thereof, in which reference will be made to the accompanying drawings. In the drawing:

FIG. 2 shows the rear view of the holding apparatus and the device held thereby;

Figure 1:
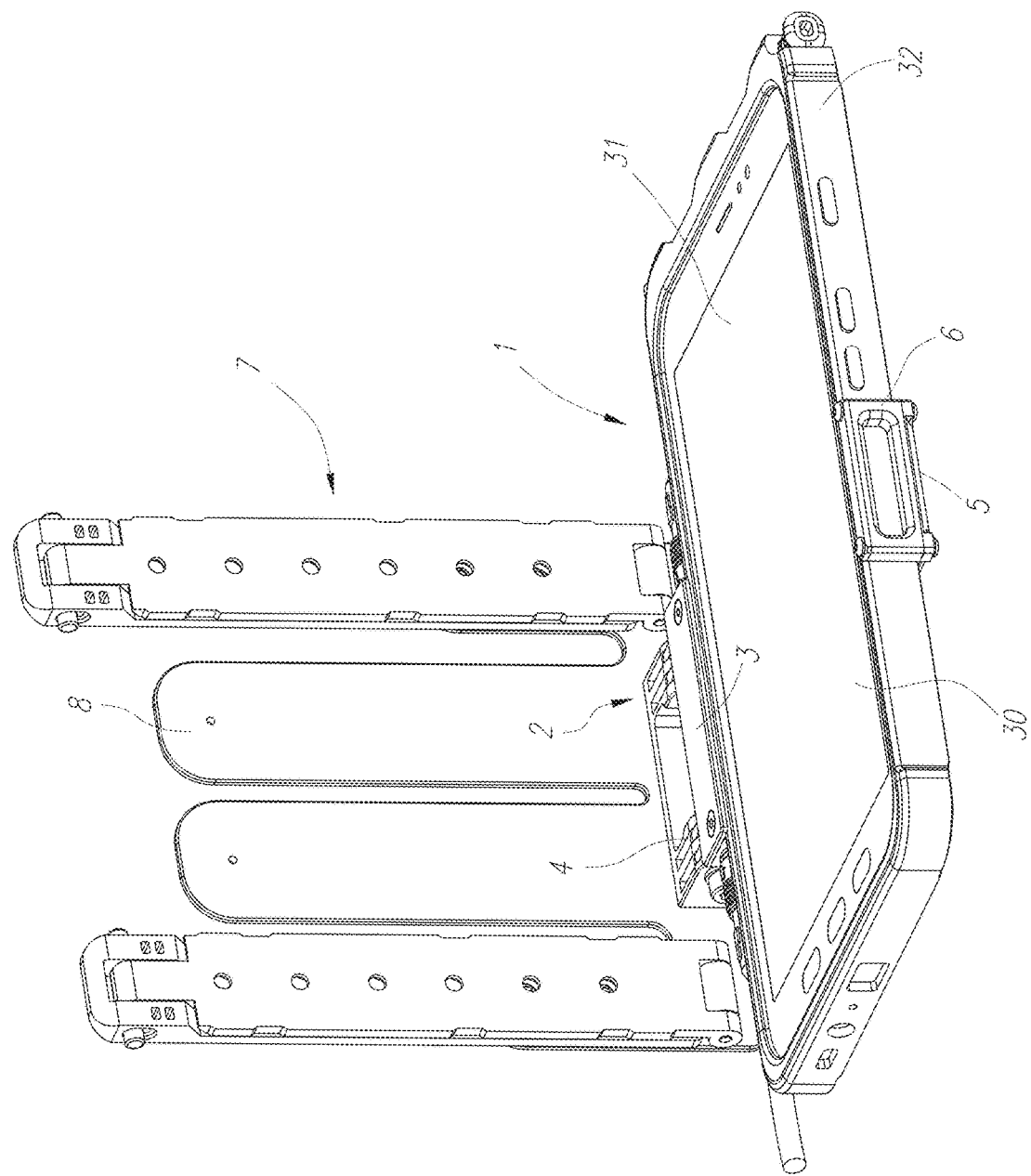
FIG. 1 shows the perspective view of the holding apparatus and the device held thereby in open state having symmetrical support tongues.

In FIG. 1 the main part of the solution according to the invention can be seen in assembled state in a ready to use position. The main task of the holding apparatus is to allow a comfortable wear of a mobile industrial device 30 representing a working tool for a user on his/her body and to enable comfortable full-scale use and handling of the device when the need arises to do so. The expression "full-scale use" is intended to cover that use is not limited to any selected function (e.g., conducting phone calls) but all functions of the device 30 can be used, i.e., the user can watch the screen, can enter data either by a virtual keyboard displayed on a touch screen or by any connected device. This all can be performed in a comfortable way in the field under outdoor circumstances so that the user will not be limited in his/her free movements and use of his/her hands when there is a need for such use. The deice 30 is not designed to the need of average users but for use under industrial, professional circumstances and it is arranged in a sufficiently rigid and strong case, and it is also provided with waterproof stable connectors. In such connectors predominantly spring biased contact elements are used sold under the commercial name POGO PIN™ that are built in sufficiently stable and rigid receptacles, and they are mostly arranged in the central zone of the long narrow side of the device 30 that has mostly a rectangular shape.

The device 30 illustrated in FIG. 1 is an industrially built mobile phone but instead of it an industrially designed tablet or any other flat smart device can be arranged. In FIG. 1 the viewer can see holding unit 2 of a holding apparatus 1 that comprises parts including a support block 3, and a small portion of a friction hinge 4 can be seen which is connected to the support block 3, and an upper fixing nest 6 of a holding frame 5 is connected to the holding unit 2, wherein the upper fixing nest 6 is fitted to and presses the long upper side of the device 30 which extends opposite to the side connected to the support block 3.

For using the holding apparatus 1 there is a need for the presence of a suspension assembly 7 which does not form part thereof and which has a conventional design and comprises in the exemplary case four holding tongues 8 interconnected at their first side and coupled to the hinge 4. The design of the suspension assembly 7 is such that it can be attached or suspended on the previously referred MOLLE waistcoat or other clothes with straps designed for field use, and the two outermost tongues 8 fixes the position of the suspension assembly 7 on the waistcoat or other similar clothing's. During normal use the suspension assembly has a vertical plane, and it is pressed against the chest of the wearer. FIG. 1 illustrates the holding apparatus 1 in the position of its use when the hinge 4 is in its outwardly turned to the extreme position, in which the plane of display 31 of the device 30 is horizontal or it is only slightly inclined in upward direction, whereby the user can see the display 31 and can handle the device 30 easily with both his hands.

Reference is made now to FIG. 2 that shows the rear view of the holding apparatus 1 and wherein the suspension assembly 7 is not attached to it. The friction hinge 4 has an elongated body comprising respective bearing shafts 9, 10 and respective pairs of slots at its two sides that receive pairs of lugs 19 projecting out from the support block 3, and the shape of the lugs 19 can be seen in the enlarged views of FIGS. 7 and 8. In FIG. 2 the support block 3 is covered and from it visible are its two sides only, where specially designed waterproof connectors 11, 12 can be seen which are connected to these sides, and they have the task of enabling the connection of outer peripheral units to the device 30 held by the holding apparatus 1. The holding frame 5 is a plate that has the shape shown in FIG. 2 which is fixed at its bottom part by means of a pair of threaded bolts to respective threaded bores provided in the rear wall of the support block 3 and extends along the rear plate of the device 30 till its upper side. At the upper part of the holding frame 5 a large cut opening is provided limited by two narrow branches 13, 14 at the two sides, of which the branch 14 extends in an inclined way towards the other branch 13 then follows the shape of the cut. The holding frame 5 can be made by a polyester sheet reinforced by glass or carbon fibers and has a predetermined extent of flexibility. The fixing nest 6 shown in FIG. 1 is connected to the upper end of the holding frame 5, and the fixing nest 6 extends normal to the plane of the holding frame 5 and presses the upper side of the device 30 in downward direction. The holding frame 5 is dimensioned in such a way that its height when the device 30 is inserted into the socket provided in the support block 3 (see the later part of the present description) is slightly shorter than the width of the device 30, but has sufficient flexibility to allow the engagement of the fixing nest 6 into the upper side of the device 30 when being pulled with a sufficient force, and following the engagement the fixing nest 6 presses the device 30 in downward direction and the device 30 takes thereby a stable position in the holding frame 5. This connection is stabilized by the presence of a short rim 15 extending downward from the forward end of the fixing nest 6 shown in the enlarged view of FIG. 5, and the rim 15 fits to the upper side 32 of the device and prevents the device 30 from turning and falling outward from the fixing nest 6. The device 30 can be removed from the holding frame 5 by pulling the fixing nest 6 in upward direction with a sufficient force for the disengagement against the resistance of the holding frame 5. Then the device 30 can be turned slightly outward and pulled up till the disengagement from the support block 3, and then the device 30 can be removed in an easy way.

Figure 5:
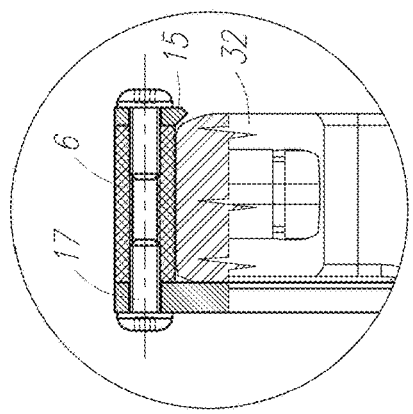
FIG. 5 shows the enlarged sectional view of the detail framed in FIG. 4.
Figure 4:
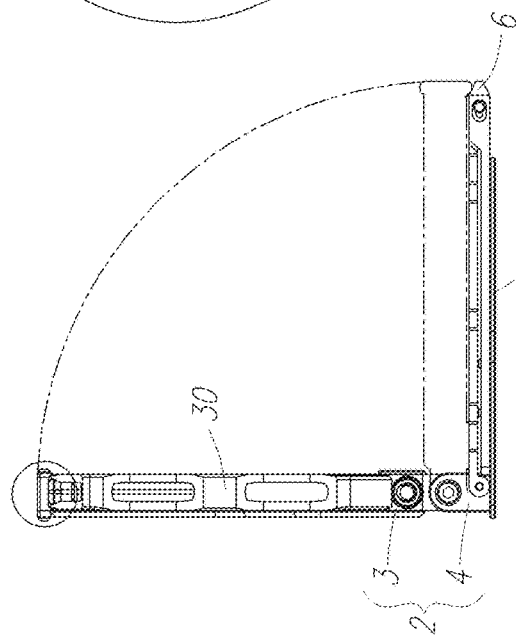
FIG. 4 shows the side view of the arrangement shown in FIG. 3.
Figure 6:
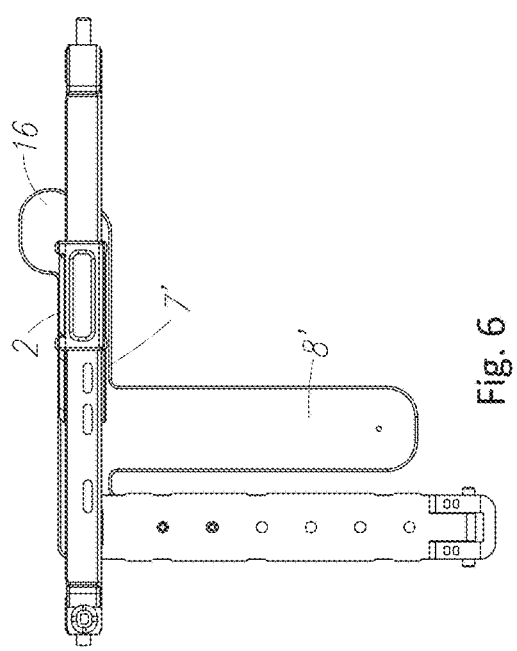
FIG. 6 shows the top view of the arrangement shown in FIG. 3.

Reference is made now to FIGS. 3 to 6 which show the use of the device 30 with the holding apparatus 1. FIG. 6 corresponds to FIG. 1 but with a smaller scale and in front view. FIG. 4 is the side view of FIG. 3 that shows the holding apparatus 1 in open state (drawn with full line) and in closed state (drawn with the dash dot line). The difference with respect to FIG. 1 is that in FIG. 1 the suspension assembly 7' is in FIG. 4 in horizontal position, but—as mentioned earlier—when it is worn on the body of a user, its position will be vertical. FIG. 6 shows the top view of the arrangement of FIG. 3. A substantial difference compared to FIG. 1 lies also in that in FIG. 1 the suspension assembly 7 was symmetrical, while in FIG. 6 the suspension assembly 7' is asymmetrical.

Figure 3:
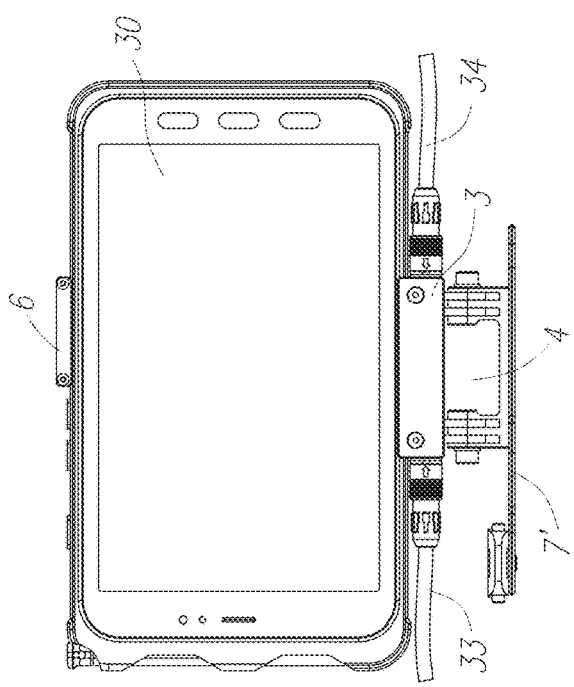
FIG. 3 shows the front view of the holding apparatus and the device held thereby equipped with asymmetric support tongues.

In FIG. 3 it can also be observed that to the two sides of the support block 3 respective connecting cables 33, 34 are connected, which have respective other ends (not shown in the drawing) that lead to different optional peripheral devices or a power supply also held by the user, whereby the cables enable the use of such peripheral devices with the device 30. In FIG. 4 it can also be observed that the holding unit 2 not only holds and connects the device 30 but also enables its turning which is indicated by the two extreme positions. In the open state drawn by full lines, the device 30 is in a ready to use position, as also shown in FIG. 1, whereas out of use the device 30 can be turned into the support plane of the suspension assembly 7 or 7', and now it will have a minimum depth and cannot disturb the free movement of the user. For the definite and comfortable use the hinge 4 has a special design with high friction so that it can be turned only against the application of a predetermined torque, and it can remain in a stable way in any previously set angular position.

In FIGS. 3 and 4 it can also be observed that the distance between the support block 3 and the hinge 4 is small, whereby the cables 33, 34 connected to the device are positioned close to the axis of rotation and their axes extend parallel to this axis of rotation, therefore when the device is turned out or in, the cables will at most get slightly twisted but there will be not break in their lines as it happens at most of conventional fixing arrangements. The mechanical load acting on the cables is therefore small, and the lifetime and stable operation of the cables are not influenced by the frequency of use, and in addition to these conditions the bottom side 35 of the device 30 provides at the same time a mechanical protection for the cables 33, 34.

The suspension assembly 7' shown in FIG. 6 has only two holding tongues 8', but at the same time a short tab 16 extends out of the suspension assembly 7' at the other side of the holding unit 2. Such a design can be used when the holding apparatus 1 should be placed on one side of a vest which is separated in the middle by buttons or by a slide fastener when the holding tongues 8' are suspended only at one side of the vest. After buttoning the vest further tongues (not shown in the drawings) can be suspended to its other side, and their end of such further tongues can be connected to the tab 16 of the suspension assembly 7', whereby the suspension gets symmetric, whereas the vest can be worn in the usual way, not disturbed by the holding of the device.

In the enlarged view of FIG. 5 the details of the internal structure of the fixing nest 6 can be seen. Close to the two ends of the fixing nest 6 respective short shafts 17 are arranged which provide a definite strength to the pressure provided by the fixing nest 6 and it also facilitates the insertion and removal of the device 30. The material of the fixing nest 6 is preferably aluminum or a plastic material which has a shape fitting to the case of the device 30 made also from a similarly resilient material and can press it with the required force.

Figure 7:
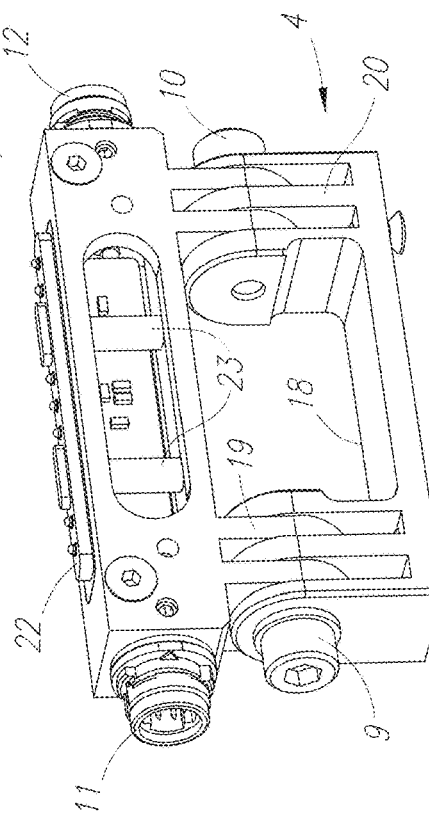
FIG. 7 shows the enlarged perspective view of the holding apparatus with open support block.

Reference is made now to FIG. 7 showing the enlarged perspective view of the holding unit 2, in which the support block 3 is still in open state before its connection to the device 30.

The hinge 6 has narrow elongated body 18, and from the two sides of the body 18 respective triplets of spaced ribs 20 extend out in upward direction normal to the base plane, and the ribs 20 have curved upper portions and define respective pairs of spaces between them. The two pairs of the lugs 19 extending out in downward direction from the bottom of the support bock 3 are inserted and fitted into these spaces. The frictional connection is provided by the fastening of the bearing shafts 9, 10 and the sufficiently rough surface design of the so interconnected surfaces. In the bottom of the body 18 a plurality of threaded bores is provided, and the suspension assembly 7 or 7' can be fixed by bolts 21 inserted into these threaded bores. The support block 3 is mounted on the hinge 4 and has about the same width and depth, a brick-like shape and a hollow interior. At the upper side of the support block 3 opposite relative to the hinge 4 a socket 22 is attached that is provided with POGO PIN contacts and which is raised out from the upper side of the block surface and the extended part has a predetermined profile. In view of the hollow design of the support block 3 the socket 22 is held by a pair of internal supports 23 looking like short columns. In FIG. 7 the two waterproof connectors 11, 12 are well visible and they are mounted on the two sides of the support block 3. The hollow internal space of the support block 3 provides room for the electrical interconnections and for the components of the circuitry required for the operational coupling between the socket 22 and the two connectors 11, 12.

Figure 8:
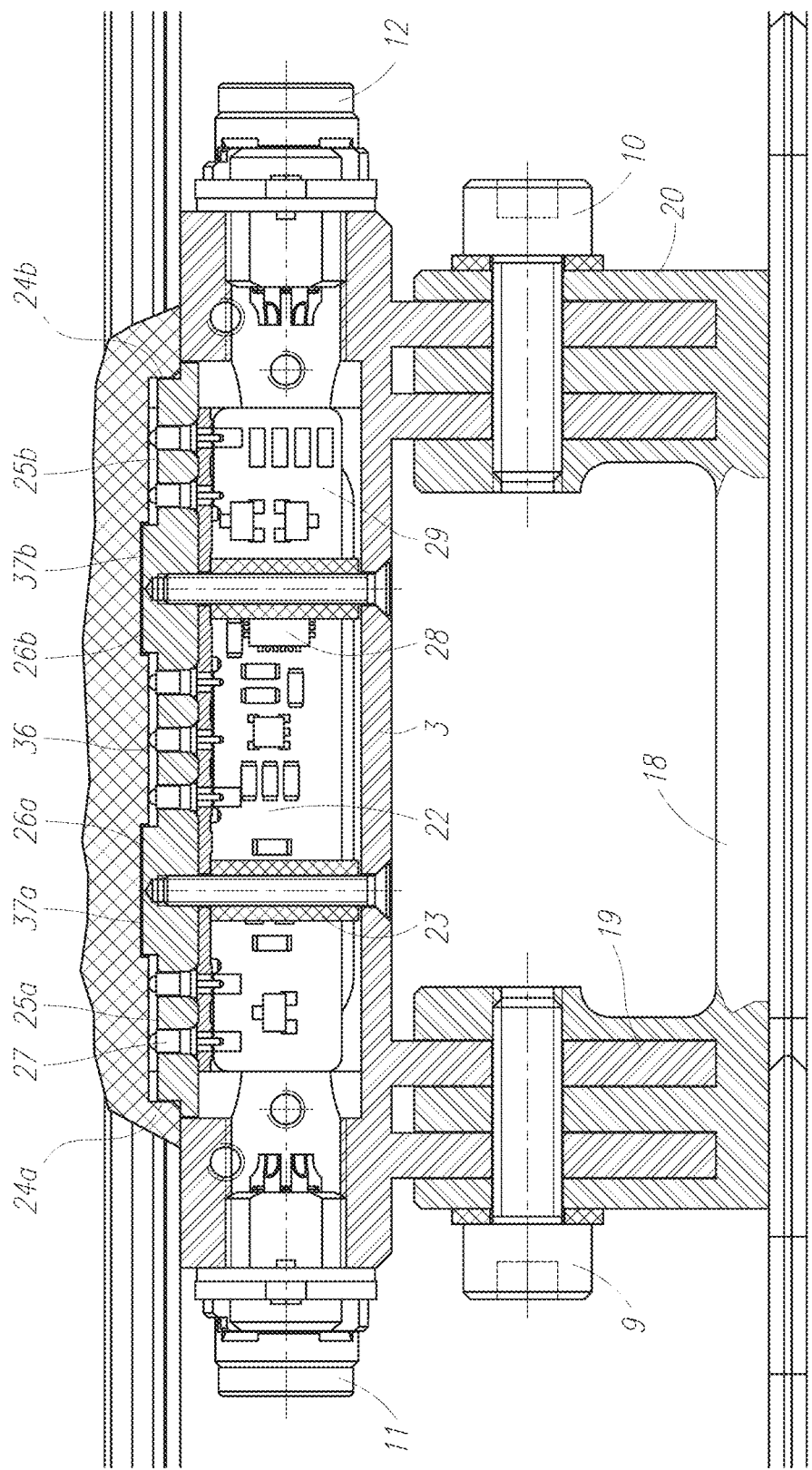
FIG. 8 shows the enlarged sectional view of the holding apparatus.

Reference is made now to the enlarged sectional view of FIG. 8 in which the holding unit 2 has been shown in its final assembled state, and in which a connector plug 36 has been shown provided on the bottom side 35 of the device 30 and which is the counterpart of the socket 22. In the sectional view it can be seen that the body of the socket 22 has a stepped upper profile, at the two sides the upwardly extending members from the top of the support block 3 have respective edges 24a, 24b followed towards the center parts by respective horizontal sections 25a, 25b, and between them respective further outwardly extending horizontal sections 26a, 26b are provided where the socket 22 takes its maximum thickness (height). The rear parts of these sections 26a, 26b receive the screws inserted into respective bores made in the column-like supports 23. The upper surface of the outwardly projecting sections 26a, 26b are higher than the upper ends of the spring-biased contacts 27 of the socket 22.

The profile of the connector plug 36 fixed to the bottom side 35 of the device 30 is just the complementary of the profile of the socket 22, wherein corresponding to the two edges 24a, 24b at the two sides there are respective inward steps, and opposite to the swelling sections 26a, 26b there are nests 37a, 37b. The contact surfaces of the connector plug 36 required for the electrical connections terminate at the horizontal surfaces between and beside the nests 37a, 37b and they press against the oppositely located spring-biased contacts 27. These contact surfaces are located slightly deeper than the swelling sections 26a, 26b.

The socket 22 in the support block 3 and the connector plug 36 at the side of the device 30 have conforming and fitting profiles and such conforming profiles limited at the two sides by the edges 24a, 24b and in the intermediate portion by the swelling sections 26a, 26b cooperate with the receiving nests and provide a very stable support and form-fitting reception for the device 30, therefore there will be no need for using further receiving and supporting parts. This form-fitting connection can be released only if the device 30 is raised from the support block 3. The dimensions shown ensure that no forces can act on the sensitive contact until the two fitting parts get into engagement, since the connector plug 36 can be moved in downward direction only after it has been fitted into the socket 22.

In the hollow interior of the support block 3 components 28 required for the electrical connections are arranged when fixed in a suitably designed printed circuit board 29, and they ensure proper connection of the two connectors 11, 12.

The number and the type (negative or positive) of the contacts in the connectors 11, 12 are determined by the properties of the peripheral units connectable to the device 30 and by the requirements imposed against these units.

A common property of the embodiments described that the holding arrangement 1 can receive the device 30 with minimum additional weight and volume, whereas the load imposed on the connection cables and connectors is at minimum, and the insertion and removal of the device 30 is simple but very stable and durable, therefore it satisfies the requirement imposed to devices used under field circumstances.

The invention claimed is:

1. A holding apparatus (1) for supporting and connecting an industrial mobile device (30), wherein the mobile device (30) has a flat body, a pair of oppositely located parallel sides (32, 35), and an industrial-type connector plug (36) at one side of the pair of oppositely located parallel sides, the holding apparatus comprising:

a holding unit (2) configured to releasably attach to the one side of the pair of oppositely located parallel sides (32, 35), the holding unit (2) comprising a friction hinge (4) having a hinge body and a support block (3) directly connected to the friction hinge (4) and connectable to the mobile device (30), wherein the friction hinge (4) is connected to a suspension assembly (7, 7'), and the support block (3) has a rectangular shape and comprises a hollow interior, and a connector socket (22) is arranged on a side of the support block (3) opposite to a side of the support block connected to the friction hinge (4) and configured to receive the industrial-type connector plug (36) when the mobile device (30) is in a held and fitted position in the holding unit, the connector socket configured to hold and fix the mobile device to the holding unit when receiving the industrial-type connector plug, and a bottom of a flat holding frame (5) is connected along a rear side of the support block (3) lying normal to the side of the support block where the connector socket (22) is arranged, the flat holding frame (5) having a height that corresponds to a distance between the pair of two holding sides (32, 35) of the mobile device (30), the holding frame (5) has an upper side from which a fixing nest (6) extends out in a direction normal to a plane of the holding frame (5) that has a size along this normal direction that corresponds to a thickness of the upper side (32) of the mobile device (30), and a short, downwardly extending rim (15) is arranged at an outer end of the fixing nest (6), wherein a height and material of said holding frame (5) is designed so that the fixing nest (6) acts with a resilient pressure on the mobile device (30) when the industrial-type connector plug is received in the connector socket, the mobile device (30) being securable in the holding frame (5) under the effect of the resilient pressure by and between the connector socket and the fixing nest.

2. The holding apparatus as claimed in claim 1, wherein connection of the friction hinge (4) is provided by spaced ribs (20) extending out from a bottom of the friction hinge towards the support block (3) and lugs (19) extending out from a bottom of the support block (3) and inserted into spaces of the spaced ribs (20), the connection of the friction hinge provided as well by bearing shafts (9, 10) interconnecting the ribs (20) and the lugs (19), the connector socket (22) is arranged at an opposite upper side of the support block (3) from where the lugs (19) extend out, and at two sides of the upper surface of the connector socket (22) upwardly directed edges (24*a*, 24*b*) are provided and between the edges (24*a*, 24*b*) outwardly swelling sections are arranged, and between the edges (24*a*, 24*b*) at least a further section (26*a*, 26*b*) is arranged that has an upper surface extending parallel with the upper side and the section (26*a*, 26*b*) swells out more than the other sections beside it, and a profile of the upper part of the connector socket (22) is complementary to a profile of a bottom of the industrial connector plug (36) of the device (30), and at least at one side of the support block (3) a multi-pole industrial connector (11, 12) is arranged having contacts coupled to circuit components and/or wires arranged in the hollow interior of the support block (3) and to the contacts of said socket (22).

3. The holding apparatus as claimed in claim 1, wherein, in the interior of the hollow support block (3), a pair of column supports (23) is arranged, both having a central bore, and the connector socket (22) is attached to the support block (3) by means of threaded bolts led through the central bore of each column support of the pair of column supports.

4. The holding apparatus as claimed in claim 1, wherein respective industrial connectors (11, 12) are mounted to both lateral ends of the support block (3).

5. The holding apparatus as claimed in claim 1, wherein an opening is provided at an upper part of the holding frame (5), and at two sides of the opening respective narrow branches (13, 14) are provided having upper ends coupled to respective sides of the fixing nest (6).

6. The holding apparatus as claimed in claim 1, wherein, from both sides of the hinge body of the friction hinge (4), respective triplets of spaced ribs (20) are extending out in upward direction towards the support block (3), and in spaces between the ribs of the respective triplets of spaced ribs (20) respective lugs (19) are arranged extending out from the support block (3) in downward direction towards the friction hinge (4), and at both sides of the hinge body respective bearing shafts (9, 10) are inserted and led through bores provided in the respective triplets of spaced ribs (20) and lugs (19) to press the ribs of the respective triplets of spaced ribs (20) and lugs (19) together with a predetermined force.

7. The holding apparatus as claimed in claim 1, wherein, at an upper part of the socket (22) on the support block (3), two upwardly extending spaced sections (26*a*, 26*b*) are provided, and the mobile device (30) to be held by the holding apparatus (1) has the industrial-type connector plug (36) that has a form-fitting complementary shape with respect to a shape of the socket (22) and has nests opposite to spaced sections (26*a*, 26*b*), and contacts (27) of the socket (22) are electrically connectable with contacts of the industrial-type connector plug (36) only after said complementary sections have been at least partially inserted into each other.

8. The holding apparatus as claimed in claim 1, wherein, in the hollow interior of the support block (3), the electrical components are mounted on a printed circuit board (29) fixed in the hollow interior.

9. The holding apparatus as claimed in claim 1, wherein the suspension assembly (7) comprises a plurality of spaced holding tongues (8) that are insertable into respective pouches of a MOLLE type gear, wherein the plurality of spaced holding tongues (8) are arranged symmetrically with respect to the holding unit (2).

10. The holding apparatus as claimed in claim 1, wherein the suspension assembly (7') comprises a plurality of spaced holding tongues (8') that are insertable into respective pouches of a MOLLE type gear, wherein the plurality of spaced holding tongues (8') are arranged asymmetrically with respect to the holding unit (2) at one side thereof, and from the other side of the holding unit (2) a connection tab (16) extends out for enabling use of further holding tongues.

\* \* \* \* \*